(12) United States Patent
Kahl

(10) Patent No.: US 12,544,827 B2
(45) Date of Patent: Feb. 10, 2026

(54) APPARATUS FOR LOADING A CAGE WELDING MACHINE AND CAGE WELDING MACHINE

(71) Applicant: MBK Maschinenbau GmbH, Kisslegg (DE)

(72) Inventor: Manfred Kahl, Isny (DE)

(73) Assignee: MBK Maschinenbau GmbH, Kisslegg (DE)

( * ) Notice: Subject to any disclaimer, the term of this patent is extended or adjusted under 35 U.S.C. 154(b) by 0 days.

(21) Appl. No.: 18/438,572

(22) Filed: Feb. 12, 2024

(65) Prior Publication Data

US 2024/0189885 A1 Jun. 13, 2024

Related U.S. Application Data

(63) Continuation of application No. 17/449,678, filed on Oct. 1, 2021, now Pat. No. 11,931,794, which is a
(Continued)

(51) Int. Cl.
*B21F 27/12* (2006.01)
*B65G 29/00* (2006.01)
(Continued)

(52) U.S. Cl.
CPC ............ *B21F 27/124* (2013.01); *B65G 29/00* (2013.01); *B65G 47/84* (2013.01); *B65G 47/1407* (2013.01)

(58) Field of Classification Search
CPC .... B65G 29/00; B65G 47/84; B65G 47/1407; B21F 27/124; B21F 27/121; B21F 27/122;
(Continued)

(56) References Cited

U.S. PATENT DOCUMENTS 1,871,751 A * 8/1932 Sherwan ............... B21F 27/124
140/71 R
3,254,681 A * 6/1966 Magers, Jr. ........... B21F 27/124
140/112
(Continued)

FOREIGN PATENT DOCUMENTS

DE 2 008 095 A 8/1971
EP 0561007 A1 * 9/1993 ............ B21F 27/124
(Continued)

OTHER PUBLICATIONS

International Search Report and Written Opinion (Application No. PCT/EP2019/058549) dated Jan. 28, 2020.
(Continued)

*Primary Examiner* — Gregory W Adams
(74) *Attorney, Agent, or Firm* — BURR PATENT LAW, PLLC

(57) ABSTRACT

An apparatus for equipping a basket welding machine, the apparatus having an insertion device. The apparatus is characterized in that the insertion device has a plurality of receiving positions for all the longitudinal wires of a basket to be produced using the basket welding machine, the insertion device having a receiving element for receiving the longitudinal wires of a basket, the receiving positions being spaced apart in the radial direction from an axis of rotation of the insertion device, wherein the insertion device is designed to feed at least two longitudinal wires arranged on the insertion device to the basket welding machine simultaneously in one insertion operation, the insertion operation of the longitudinal wires into the basket welding machine being effected by a movement of the insertion device in the axial direction of the axis of rotation of the insertion device. The invention further relates to a basket welding machine.

4 Claims, 6 Drawing Sheets

Related U.S. Application Data continuation of application No. PCT/EP2019/058549, filed on Apr. 4, 2019.

(51) Int. Cl.
*B65G 47/84* (2006.01)
*B65G 47/14* (2006.01)

(58) Field of Classification Search
CPC . Y10T 29/49632; E04C 5/0604; B21D 39/06; B23P 19/022; B25J 1/02
USPC .................................................. 294/111, 211
See application file for complete search history.

(56) References Cited

U.S. PATENT DOCUMENTS

| | | | |
|---|---|---|---|
| 3,579,259 A | | 5/1971 | Kato |
| 3,718,797 A | * | 2/1973 | Pfender .................. B21F 27/124 228/49.1 |
| 4,314,129 A | * | 2/1982 | Wilson .................. B23K 11/008 219/56 |
| 4,543,711 A | * | 10/1985 | Wada ..................... B23P 19/022 29/709 |
| 5,053,597 A | | 10/1991 | Ritter et al. |
| 5,113,730 A | * | 5/1992 | Ducanis ................. B23B 13/126 82/162 |
| 5,228,191 A | * | 7/1993 | Casterline ............. F28D 7/1638 29/726.5 |
| 5,665,254 A | | 9/1997 | Isono et al. |
| 8,533,956 B2 | | 9/2013 | Perry |
| 9,586,762 B1 | | 3/2017 | Graf |
| 11,931,794 B2 | * | 3/2024 | Kahl ...................... B65G 29/00 |
| 2004/0163236 A1 | * | 8/2004 | Tokunaga ............. B23P 19/022 29/890.038 |
| 2008/0257445 A1 | | 10/2008 | Subacchi |
| 2019/0001395 A1 | | 1/2019 | Hartenbauer |

FOREIGN PATENT DOCUMENTS

| | | | | |
|---|---|---|---|---|
| GB | 525485 A | | 8/1940 | |
| JP | H02-015843 A | | 1/1990 | |
| JP | 2684541 B2 | * | 12/1997 | ............ B21F 27/124 |
| RU | 1804363 A3 | | 3/1993 | |
| SU | 556876 A1 | | 5/1977 | |
| SU | 577071 A1 | | 10/1977 | |
| WO | WO-2005084848 A1 | * | 9/2005 | ............ B21F 27/124 |
| WO | 2012/055803 A2 | | 5/2012 | |
| WO | WO-2014184787 A1 | * | 11/2014 | ............ B21F 27/124 |
| WO | 2016/132316 A1 | | 8/2016 | |
| WO | WO-2017153602 A1 | * | 9/2017 | ................ B21F 1/00 |

OTHER PUBLICATIONS

English translation of the International Preliminary Report on Patentability (Chapter I) (Application No. PCT/EP2019/058549) dated Oct. 14, 2021.

Russian Office Action (Application No. 2021132094) dated Oct. 18, 2022.

* cited by examiner

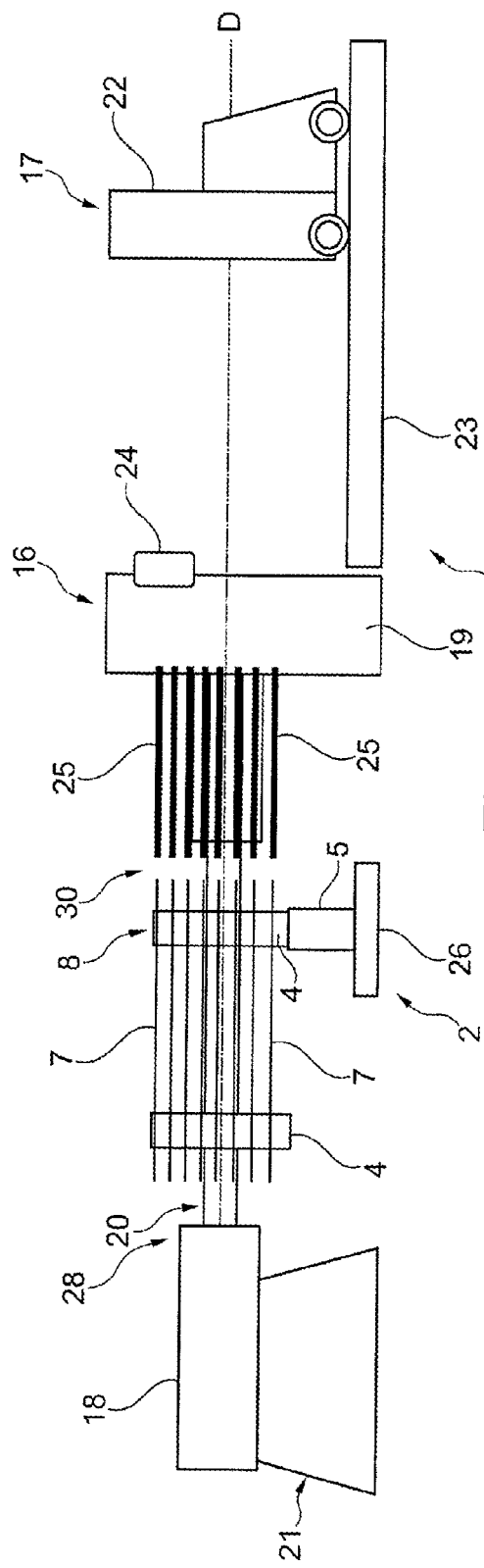
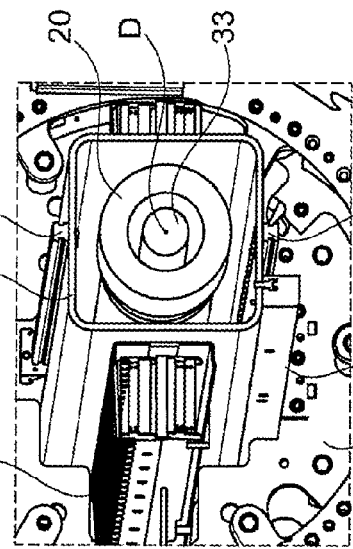
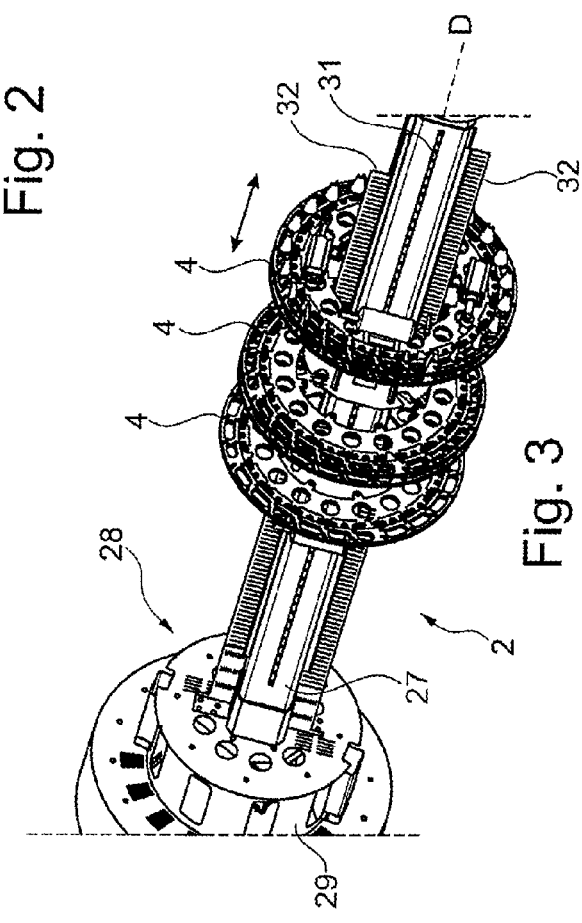
Fig. 2
Fig. 3
Fig. 4

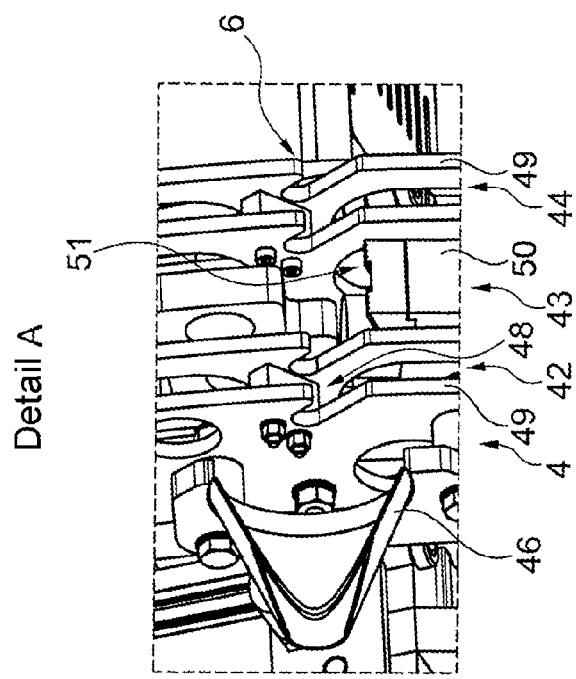
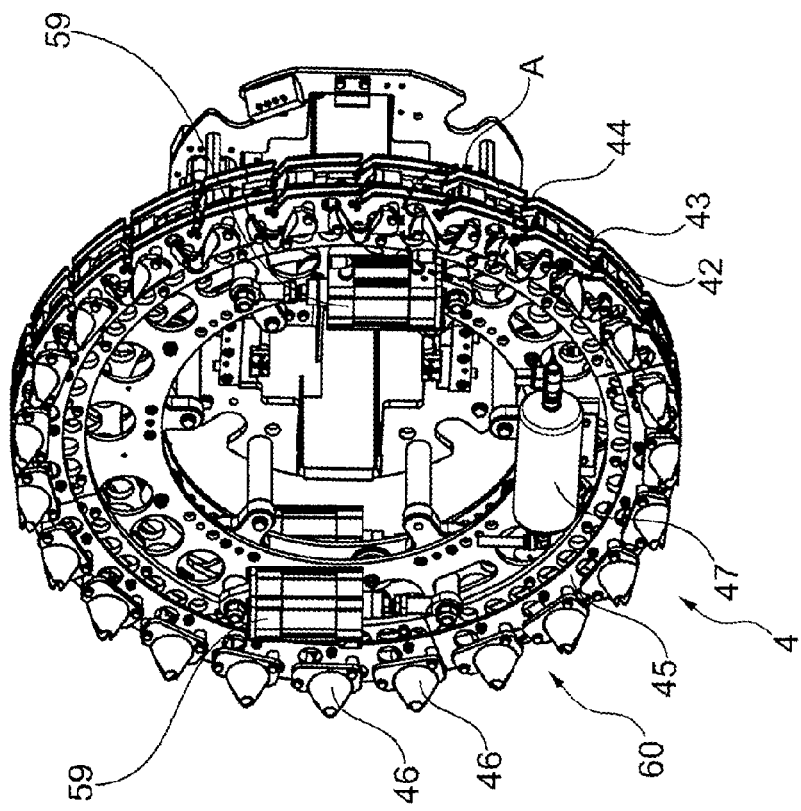

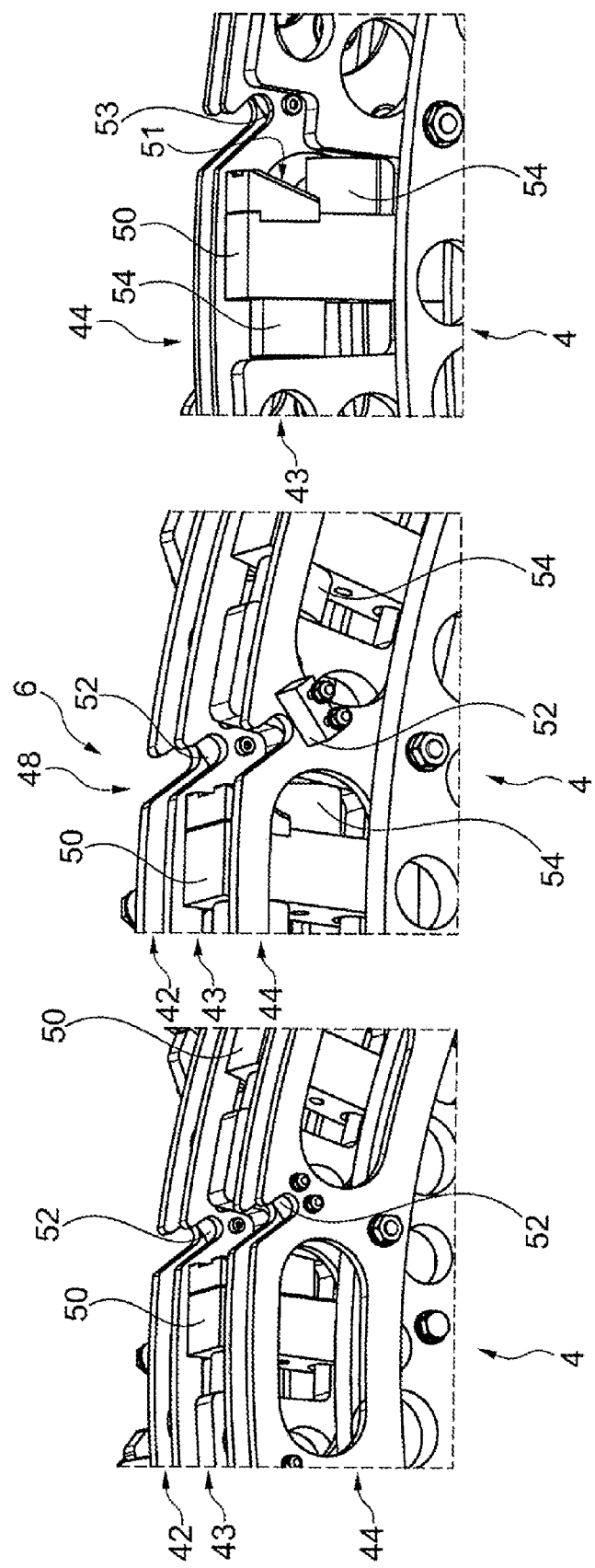

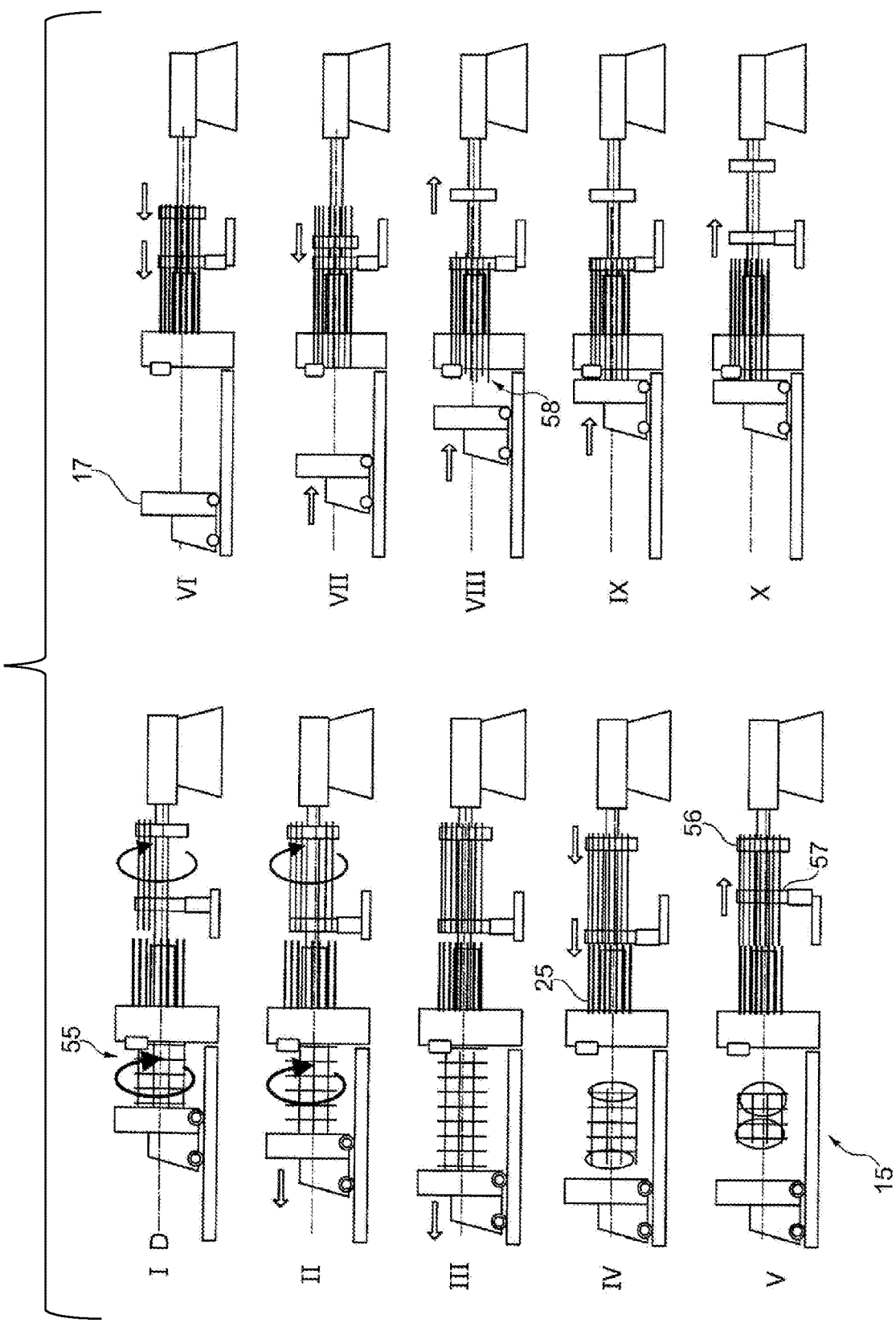

APPARATUS FOR LOADING A CAGE WELDING MACHINE AND CAGE WELDING MACHINE

CROSS REFERENCE TO RELATED APPLICATION

This application is a continuation of U.S. application Ser. No. 17/449,678, filed Oct. 1, 2021, which in turn is a continuation of International Application No. PCT/EP2019/058549 filed Apr. 4, 2019, which designated the United States, the entireties of which are incorporated herein by reference.

FIELD OF THE INVENTION

The present invention relates to an apparatus for loading a cage welding machine and cage welding machine.

BACKGROUND OF THE INVENTION

An apparatus for loading a cage welding machine is already known.

A known loading apparatus is configured as an automated apparatus which loads a cage welding machine with longitudinal wires of a reinforcement cage to be produced, wherein the apparatus feeds the longitudinal wires of the reinforcement cage to be produced individually, in succession in the direction of a longitudinal axis of the cage welding machine, wherein the longitudinal axis corresponds to an axis of rotation of the cage welding machine.

In the case of the known apparatus, the apparatus and the cage welding machine are coordinated with one another in such a way that after an individual receiving position has been loaded with an individual longitudinal wire by the apparatus, a production wheel of the cage welding machine rotates one receiving position further about an axis of rotation of the production wheel such that a further receiving position of the production wheel which has not yet been loaded with a longitudinal wire can be loaded by the apparatus. Here, the process is repeated until the apparatus has loaded the cage welding machine with all the longitudinal wires required for the production of a reinforcement cage.

SUMMARY OF THE INVENTION

The present invention is based on the object of providing an improved apparatus for loading a cage welding machine, in particular, an improved apparatus for loading a cage welding machine that can be used to carry out comparatively faster loading of the cage welding machine.

The present invention proceeds from an apparatus for loading a cage welding machine, wherein the apparatus has an insertion device. For example, the apparatus is configured as an insertion device for feeding longitudinal wires to a cage welding machine.

The cage is configured, for example, as a reinforcement cage. Advantageously, the cage welding machine is configured to produce reinforcements, in particular, to produce reinforcement cages for concrete pipes. For example, the cage welding machine comprises a welding installation for welding a longitudinal wire to a cross wire and/or a binding unit for connecting the longitudinal wire to the cross wire, for example, by means of a loop. Advantageously, the cage welding machine comprises an expansion apparatus which has an expansion slide, wherein the expansion slide is configured to change a radial position of an actuating element for a longitudinal wire of the reinforcement via a transmission means of the expansion apparatus, in particular, during the production process of the reinforcement. The actuating element is advantageously present on an expansion wheel of the cage welding machine. The transmission means of the expansion apparatus are formed, for example, as a drive chain and/or as a drive rod. The expansion wheel, for example, a main wheel and/or an advancing wheel, comprises, for example, 4 to 48 spokes, 8 to 40 spokes, 12 to 36 spokes, 16 to 32 spokes or 20 to 28 spokes, in particular 24 spokes.

Preferably, the cage welding machine comprises a main wheel and an advancing wheel. The main wheel is in the form of an expansion wheel, for example. Wire guide tubes are advantageously fastened to the main wheel, in particular, to the spokes of the main wheel. Preferably, the wire guide tubes are present on the main wheel so as to be movable in a radial direction. The advancing wheel is advantageously configured to clamp the longitudinal wires and to transport the longitudinal wires along an axis of rotation of the cage welding machine away from the main wheel during production of the cage.

The cage, for example, in the form of a reinforcement body or a reinforcement cage, is advantageously configured as a reinforcement of a pipe, of a post, of a prop and/or of a pillar. The reinforcement body is, for example, of rectangular, square, multi-angled or polygonal, round and/or oval configuration in cross section, in particular, as viewed transversely to a longitudinal extent of a bar.

Preferably, the cage, for example, the reinforcement body, has a plurality of longitudinal wires and a wire, in particular, a winding wire, wherein the longitudinal wires can be connected to the winding wire by the cage welding machine. It is also conceivable for two, three or more winding wires to be provided on the reinforcement body.

A longitudinal wire is advantageously of bar-like configuration. A longitudinal wire is, for example, in the form of a bar, in particular, in the form of a longitudinal bar.

The cage welding machine is configured, for example, as a post reinforcement cage welding machine and/or a pillar reinforcement cage welding machine and/or as a pipe reinforcement cage welding machine and/or as a reinforcement pipe welding machine. It is also conceivable that a reinforcement mat cage, for example, a three-dimensional reinforcement mat, can be produced using the proposed cage welding machine.

An advantageous, in particular, essential, embodiment of the present invention is that the insertion device has a receiving element for receiving longitudinal wires of a cage to be produced using the cage welding machine, wherein the insertion device has, on the receiving element, a multiplicity of receiving positions for all the longitudinal wires of the cage, wherein the receiving positions are present in the radial direction so as to be spaced apart from an axis of rotation of the insertion device, wherein the insertion device is configured to simultaneously feed at least two longitudinal wires arranged on the insertion device to the cage welding machine in an insertion operation, wherein the operation of inserting the longitudinal wires onto the cage welding machine is effected by a movement of the insertion device in an axial direction of the axis of rotation of the insertion device. In this way, the cage welding machine can be loaded with longitudinal wires in a comparatively rapid manner. Preferably, the insertion device is configured to simultaneously feed at least 3, 4, 5, 6, 7, 8, 9, 10, 11, 12, 14, 16 or at least 18 longitudinal wires arranged on the insertion device to the cage welding machine in an insertion operation.

The insertion device is configured, for example, as a longitudinal wire feed apparatus.

The axial direction of the axis of rotation is to be understood as a direction along the axis of rotation of the insertion device. In particular, the axial direction of the axis of rotation is to be understood as a direction along and/or parallel to a longitudinal extent of the axis of rotation of the insertion device. Correspondingly, a radial direction of the axis of rotation is to be understood as a direction transverse to the axial direction of the axis of rotation. For example, a radial direction of the axis of rotation is to be understood as a direction transverse to the longitudinal extent of the axis of rotation of the insertion device toward the axis of rotation or away from the axis of rotation.

The receiving element is advantageously configured as a loading wheel. Advantageously, the receiving element, in particular, in the form of the loading wheel, is movable, for example, rotatable, about the axis of rotation of the insertion device.

The loading wheel comprises, for example, 4 to 48 spokes, 8 to 40 spokes, 12 to 36 spokes, 16 to 32 spokes or 20 to 28 spokes, in particular 24 spokes. The loading wheel comprises, for example, 4, 6, 8, 10, 12, 14, 16, 28, 32, 36, 40, 48 or more spokes. For example, the receiving element comprises more than two receiving positions, in particular, more than four receiving positions. For example, the receiving element comprises 4, 6, 8, 10, 12, 14, 16, 18, 20, 22, 24, 26, 28, 30, 32, 36, 40 or 48 receiving positions. The receiving positions are advantageously formed in the region of the spokes. Advantageously, each spoke comprises one receiving position.

A receiving position is, for example, in the form of a slot-like cutout on the receiving element or of the receiving element. The cutout is configured, for example, as a slot. The receiving position is configured, for example, as a slot-like, for example, U-shaped or V-shaped cutout. Advantageously, a longitudinal extent of the cutout is configured tangentially with respect to the axis of rotation of the insertion device. For example, the slot extends tangentially with respect to the axis of rotation of the insertion device.

Preferably, the insertion device is configured to feed at least two longitudinal wires arranged on the insertion device to the cage welding machine, in particular, to the expansion apparatus of the cage welding machine, and/or to transfer them to the cage welding machine, in a single insertion operation. Advantageously, the insertion operation comprises an, in particular, single movement in an exclusively axial direction of the axis of rotation. The movement advantageously takes place along an axis-of-rotation extent of the axis of rotation of the insertion device. For example, the insertion operation comprises an, in particular, exclusively parallel movement with respect to the axis of rotation. Advantageously, the insertion device is configured to feed all the longitudinal wires arranged on the insertion device to the cage welding machine collectively in an, in particular, single insertion operation. Preferably, all the longitudinal wires required to produce a cage can be arranged on the insertion device.

Preferably, the insertion operation is effected by means of a single movement of the insertion device in the axial direction. For example, the insertion operation comprises a plurality of, in particular, linear movements of the insertion device. For example, the insertion operation comprises a plurality of movements of the insertion device, wherein all the movements are configured parallel to the axis of rotation of the insertion device. Advantageously, all the movements of the insertion operation are oriented parallel to one another. Advantageously, the insertion operation is effected by a movement of the receiving element in the direction of the cage welding machine. Preferably, the insertion operation comprises a plurality of movements of the receiving element, wherein all the movements of the receiving element are configured parallel to the axis of rotation of the insertion device. Advantageously, the insertion operation comprises an outward movement of the receiving element toward the cage welding machine, in particular, toward the expansion apparatus of the cage welding machine, and a movement away and/or return movement from the cage welding machine, in particular, from the expansion apparatus of the cage welding machine. For example, the outward movement is to be understood as a forward movement.

Advantageously, the insertion device, in particular, the receiving element, can be loaded with all the longitudinal wires in an, in particular, single loading operation, which longitudinal wires are required for production of a cage. Advantageously, the loading operation is effected, in particular completely, before the insertion operation. Preferably, the insertion device is configured so as to be able to be loaded with the longitudinal wire by a movement of the longitudinal wire in a direction transverse to the axis of rotation of the insertion device.

A further advantageous, in particular, essential embodiment of the present invention is that the apparatus has a feed apparatus, wherein the feed apparatus has a supply frame, a separating device, a transport apparatus and/or a transfer apparatus and is configured to feed longitudinal wires to the insertion device, wherein the insertion device is configured to be able to be loaded with the longitudinal wire by a movement of the longitudinal wire in a direction transverse to the axis of rotation of the insertion device, and the feed apparatus loads the insertion device from the side. In this way, the insertion device can be loaded with longitudinal wires in a comparatively rapid manner. Advantageously, the insertion device can be loaded with longitudinal wires by the feed apparatus more rapidly than required by a cage welding machine for production of the cage.

Advantageously, the side of the insertion device is present circumferentially on the insertion device. For example, the side of the insertion device can be seen circumferentially toward the outside. In particular, the side of the insertion device can be seen transverse to the axis of rotation of the insertion device away from the axis of rotation. For example, the receiving element is configured in the manner of a ring-shaped disk, a wheel and/or a cylinder and comprises a shell surface, for example, a cylinder shell surface. The shell surface or the cylinder shell surface advantageously forms the side of the insertion device. Preferably, a receiving element forms a cutout on the shell surface.

Preferably, the insertion device is configured so as to be able to be loaded with a longitudinal wire in a lateral direction with respect to the axis of rotation of the insertion device. Advantageously, the insertion device is configured so as to be able to be loaded with longitudinal wires in the radial direction with respect to the axis of rotation of the insertion device. For example, the longitudinal wires are mounted on the feed apparatus in such a way that a longitudinal extent of the longitudinal wires is oriented along the axis-of-rotation extent, in particular, parallel to the axis of rotation. For example, the feed apparatus, in particular, the transfer apparatus, is configured in such a way that the feed apparatus feeds the longitudinal wires in a direction transverse to the longitudinal extent of the longitudinal wires of the insertion device.

The supply frame of the feed apparatus is advantageously configured in such a way that more longitudinal wires than are required for production of a cage can be stored on or in the supply frame. Advantageously, the supply frame is configured as a container, in particular, as a trough.

The separating device is, for example, configured in such a way that the separating device removes an individual longitudinal wire from a supply of longitudinal wires that are stored in or on the supply frame and/or selects an individual longitudinal wire from the supply and feeds it to the transport apparatus. Preferably, the separating device is configured to feed an individual longitudinal wire to the transport apparatus. Advantageously, the separating device is configured to feed individual longitudinal wires successively to the transport apparatus.

For example, the transfer apparatus is configured to ensure that an, in particular, individual longitudinal wire is transferred from the transport apparatus to the insertion device. Advantageously, the transfer apparatus is in the form of a chute. For example, the chute is configured in such a way that a longitudinal wire can be moved, in particular, exclusively transversely with respect to its longitudinal extent, from the transport apparatus in the direction of the insertion device.

It is also advantageous for two receiving elements to be present, wherein the receiving elements comprise the receiving positions. In this way, the longitudinal wires can be mounted on the insertion device in a comparatively reliable and/or positionally accurate manner. This also makes it possible to implement comparatively rapid feeding of the longitudinal wires to the cage welding machine.

Advantageously, the receiving elements are arranged next to one another along the axis of rotation of the insertion device. For example, the receiving elements are arranged in succession in the axial direction of the axis of rotation.

Advantageously, each receiving element comprises an axis of rotation. Preferably, the axes of rotation of the two receiving elements extend in the same direction. In particular, the axes of rotation of the two receiving elements are oriented parallel to one another. Advantageously, the axes of rotation of the two receiving elements, in particular, of all receiving elements of the insertion device, coincide. For example, the axes of rotation of the two receiving elements, in particular of all receiving elements of the insertion device, form the axis of rotation of the insertion device. For example, the axes of rotation of the receiving elements and the axis of rotation of the insertion device coincide.

The receiving positions are advantageously configured to be distributed circumferentially about the axis of rotation of the receiving element, in particular, to be distributed circumferentially about the axis of rotation of the insertion device.

It is also conceivable for the receiving elements to be spaced apart from one another at a fixed, in particular, invariable distance. For example, the receiving elements are coupled to one another in a mechanical manner. For example, the receiving elements are spaced apart from one another in the axial direction at a fixed, in particular, invariable distance.

Advantageously, the side of the insertion device extends in the axial direction of the axis of rotation of the insertion device from one receiving element to the other receiving element. For example, the side of the insertion device extends along the axis of rotation of the insertion device from one receiving element to the other receiving element.

Preferably, a first receiving position of a first receiving element and a first receiving position of a second receiving element are aligned with one another in such a way that a longitudinal wire can be arranged in the two first receiving positions, such that, in the arranged state of the longitudinal wire on the first receiving positions, a longitudinal extent of the longitudinal wire is along, in particular parallel to, the axis of rotation of the insertion device. For example, the first and the second receiving element are arranged relative to one another in such a way that in each case a receiving position of the first receiving element and a receiving position of the second receiving element are aligned with one another in such a way that all the longitudinal wires required for production of a cage can be arranged in the receiving position, such that, in the arranged state of the longitudinal wires at the receiving positions, a longitudinal extent of the longitudinal wires is along, in particular parallel to, the axis of rotation of the insertion device.

For example, all the receiving positions of a receiving element are formed on the receiving element so as to be equidistant from the axis of rotation of the receiving element and/or from the axis of rotation of the insertion device in the radial direction. For example, all the receiving positions of all the receiving elements are formed on the receiving elements so as to be equidistant from the axis of rotation of the insertion device in the radial direction. Advantageously, all the receiving positions on a receiving element are formed on the receiving element in a positionally fixed manner. In particular, all the receiving positions on a receiving element are formed on the receiving element in a positionally fixed manner in a radial direction of the axis of rotation of the insertion device.

It is also advantageous for at least one receiving element to be displaceable in the axial direction of the insertion device. For example, at least one receiving element is movable along the axis of rotation of the insertion device and/or along an extent of the axis of rotation of the insertion device. Advantageously, each receiving element of the insertion device is displaceable, in particular, mounted in a displaceable manner.

Preferably, at least one receiving element can be positioned relative to a further receiving element. In particular, the receiving elements can be positioned relative to one another. For example, a receiving element can be positioned, in particular is displaceable, in the axial direction relative to a further receiving element.

It has likewise proven to be advantageous for the insertion device to have a shaft, wherein the shaft and at least one receiving element are connected to one another in a rotationally fixed manner, such that a rotational movement of the shaft brings about a rotational movement of the receiving element. This makes it possible for positions of the receiving positions to be changed by rotation of the shaft about an axis of rotation of the shaft. Advantageously, the axis of rotation of the shaft corresponds to the axis of rotation of the insertion device.

It is also conceivable for the shaft to be in the form of a guide unit, wherein the guide unit advantageously has a rail-like guide member. For example, a receiving element is guided on the shaft in the axial direction of the axis of rotation by the rail-like guide member. The shaft advantageously comprises two rail-like guide members. For example, the rail-like guide member is configured as a guide rail.

The shaft advantageously comprises a gear mechanism unit for driving a receiving element. The gear mechanism unit is configured for example as a chain gear mechanism and/or as a toothed-belt gear mechanism.

Advantageously, the shaft is configured in such a way that it can be mounted rotatably on the cage welding machine by way of a shaft end. For example, the shaft is connected, at a second shaft end, to a drive of the insertion device, wherein the second shaft end is spaced apart from and situated oppositely to the first shaft end along the axis of rotation. The drive of the insertion device is configured, for example, for driving of, in particular for rotation of, the shaft. It is also conceivable for an expansion drive for driving the expansion apparatus of the cage welding machine to be present at the second shaft end. Advantageously, the expansion drive is coupled to the second shaft end.

It is further proposed that a receiving element has a support element, wherein the receiving element is rotatably mounted on the support element. In this way, for example, the shaft is supported, in particular mounted, via a first receiving element.

The support element is configured, for example, as a shell-like receptacle, for example, as a half-shell. For example, the support element comprises a guide by means of which the receiving element is mounted so as to be rotatable in a guided manner about the axis of rotation of the receiving element, in particular, about the axis of rotation of the insertion device. Advantageously, the support element is configured as a support foot, in particular, with a shell-like receptacle. Preferably, the shell-like receptacle forms the guide for the receiving element.

Advantageously, the support element is displaceably mounted on a guide element. In particular, the support element is mounted so as to be displaceable along the axis of rotation of the shaft. Advantageously, the receiving elements are displaceably mounted on a guide element and/or the rail-like guide member. For example, all the receiving elements are displaceably mounted on the guide element and/or on the rail-like guide member. The guide element is configured, for example, as a rail element, for example, as a rail. Advantageously, the support element supports the receiving element on a floor area. For example, the insertion device can be set up on the floor area. Advantageously, the support element is supported via the guide element on the floor area.

Advantageously, a second receiving element is present along the axis of rotation between the first receiving element and the drive of the shaft.

It is further proposed that a receiving element comprises clamping elements, wherein the clamping elements are configured to clamp the longitudinal wires mounted on the receiving element. Advantageously, the clamping elements are present in the region of a receiving position, in particular, at the receiving position. Advantageously, exactly one clamping element is present at a receiving position. For example, in each case two clamping elements are present at a respective receiving position. For example, two clamping elements are configured relative to one another in a pincer-like manner on the receiving element.

Preferably, a clamping element comprises a buffer element, for example, two buffer elements. For example, a clamping element comprises exactly one buffer element, for example, exactly two buffer elements. The buffer element is for example elastic, for example buffer-like, in particular flexible. It is conceivable for the buffer element to be in the form of a rubber buffer.

Advantageously, in a closed position of the clamping element, a longitudinal wire arranged at the receiving position is fixed at the receiving position by the clamping element. For example, the clamping element bears, in particular, by way of a stop surface, on the longitudinal wire in the closed position. Advantageously, the clamping element in the closed position presses the longitudinal wire against a stop of the receiving position, such that the longitudinal wire is clamped between the stop of the receiving position and the stop surface of the clamping element. The use of a buffer element advantageously makes it possible to compensate for a dimensional difference in diameter between the longitudinal wires, such that each longitudinal wire arranged on the insertion device is clamped by means of the clamping elements in the closed position of the clamping elements.

Advantageously, the insertion device comprises an, in particular, pneumatic drive unit, by means of which a movement of the clamping elements can be driven. Advantageously, the drive unit comprises a pneumatic drive. The pneumatic drive is configured, for example, as a pneumatic cylinder. For example, a plurality of drive units, for example, two, three, five or six, in particular four drive units, are arranged on a receiving element. For example, a plurality of pneumatic drives, for example a plurality of pneumatic cylinders, are arranged on a receiving element. For example, two, three, five, six or four pneumatic drives are present on a receiving element.

Preferably, the drive unit comprises a buffer store which is present on the receiving element. The use of a buffer store has the effect that the insertion device is formed comparatively rapidly and cost-effectively. Advantageously, the buffer store is mounted so as to be rotatable about the axis of rotation of the receiving element, in particular, about the axis of rotation of the insertion device. For example, the drive unit comprises a plurality of buffer stores, in particular, two, three or four buffer stores. For example, each buffer store is arranged on a receiving element. It is also conceivable for two, three, four or more buffer stores to be arranged on each receiving element. For example, the buffer store is configured as a tank, for example, as a pressure tank.

It is also advantageous for a buffer store to be arranged on an advancing wheel of the cage welding machine and/or on a receiving element of the insertion device in such a way that the buffer store is present on the advancing wheel together with further elements of the advancing wheel, and/or the buffer store is present on the receiving element together with further elements of the receiving element, so as to be rotatable about an axis of rotation of the cage welding machine and/or about the axis of rotation D of the insertion device. In this way, for example, opening and closing of fixing elements of the advancing wheel is carried out comparatively rapidly.

Advantageously, the buffer store is present on the advancing wheel so as to be rotatable about an axis of rotation of the cage welding machine. It is also conceivable for a plurality of buffer stores to be configured on the advancing wheel, for example, two, three, four, five, seven or eight. In particular, six buffer stores are present on the advancing wheel.

Advantageously, a buffer store has a receiving volume, for example, for compressed air, of 2 liters. For example, the receiving volume of a buffer store, for example, for compressed air, is from 1 to 15 liters. For example, the receiving volume of a buffer store is from 1 to 10 liters or from 2 to 10 liters. For example, a pressure of 2 to 12 bar, of 4 to 10 bar or of 6 to 10 bar is applied to the buffer store in a maximally filled state.

Advantageously, a clamping element is pivotably, in particular, rotatably, mounted on the receiving element via a pivot axis. For example, a clamping element of a receiving element is mounted so as to be rotatable about the axis of rotation of the receiving element, in particular about the axis of rotation of the insertion device. For example, all the clamping elements of a receiving element are mounted so as to be rotatable, in particular collectively, about the axis of rotation of the receiving element, in particular about the axis of rotation of the insertion device. Advantageously, all the clamping elements of a receiving element are drivable, in particular movable, by means of a single drive. Advantageously, the pivot axis of the clamping element differs from the axis of rotation of the insertion device. Preferably, the pivot axis of the clamping element and the axis of rotation of the insertion device extend in one and the same direction, for example, they are oriented parallel to one another.

For example, the drive unit is able to rotate the clamping element in one direction, for example, in an opening direction, about the pivot axis. It is also conceivable for the drive unit to be able to rotate the clamping element in another direction, for example, in a closing direction, about the pivot axis. The closing direction and the opening direction are advantageously configured to run in opposite directions.

It is also advantageous for a magnetic element for the magnetic mounting of a longitudinal wire arranged on the receiving element to be present in the region of the receiving position. In this way, a longitudinal wire can be fixed, in particular releasably, to the receiving element in a comparatively simple and rapid manner.

For example, a clamping element comprises a magnetic element for the magnetic mounting of a longitudinal wire in the state arranged on the receiving element. Advantageously, the clamping elements and the magnetic elements of a receiving element are separate from one another. In particular, the clamping elements of a receiving element are present on the receiving element so as to be movable relative to the magnetic elements of the receiving element.

Advantageously, the magnetic element is configured as a permanent magnet, for example as a ferromagnet. For example, the magnetic element is in the form of a neodymium iron boron magnet. It is also conceivable for the magnetic element to be in the form of an electromagnet. Preferably, the magnetic element is configured in such a way and/or arranged on the receiving element in such a way that a longitudinal wire can be fixed to the receiving element in particular exclusively by the magnetic element.

It has also proven to be advantageous for three receiving elements to be present. In this way, in particular, comparatively long longitudinal wires for a comparatively large and/or long cage can be fed to the cage welding machine by means of the insertion device.

Advantageously, at least two of the three receiving elements are mounted so as to be displaceable along the axis of rotation of the insertion device. It is conceivable for two of the three receiving elements to be mounted so as to be displaceable along the axis of rotation of the insertion device and for a third receiving element to be present in a positionally fixed manner. Advantageously, all the receiving elements are movable relative to one another along the axis of rotation.

Advantageously, two of the three receiving elements are positionally fixed relative to one another, in particular, at a distance along the axis of rotation of the insertion device. Preferably, two of the three receiving elements are connected to one another in a rotationally fixed manner. In particular, two of the three receiving elements are connected to one another at a defined distance along the axis of rotation. For example, two of the three receiving elements are coupled to one another and are movable, in particular displaceable, along the axis of rotation of the insertion device relative to a third receiving element. Advantageously, two of the three receiving elements are coupled to one another, wherein at least one of the two receiving elements comprises no clamping elements. It is also conceivable for two of the three receiving elements to be coupled to one another and for only one of the two receiving elements to have clamping elements. It is also conceivable for two of the three receiving elements to be coupled to one another and for only the third receiving element to have clamping elements.

It has also been proven to be advantageous for at least two receiving elements to be configured differently to one another if the insertion device comprises two receiving elements, in particular, three receiving elements. It is for example conceivable for clamping elements to be arranged on a first receiving element and for no clamping elements to be present on a second receiving element. Advantageously, if a plurality of receiving elements are present and two of the receiving elements are configured differently to one another, one of the receiving elements serves for the pure mounting and/or support of arranged longitudinal wires along the axis of rotation of the insertion device. It is, for example, conceivable for two receiving elements to be of similar configuration and for a third receiving element to be configured differently to the two other receiving elements if the insertion device comprises three receiving elements. In this way, the insertion device is formed comparatively cost-effectively.

It is also advantageous for the receiving position to comprise a receiving opening for receiving a longitudinal wire, such that the longitudinal wire can be arranged laterally on the insertion device. For example, the receiving opening of the receiving position is on a circumferential region of the receiving element, for example, on the shell of the receiving element. For example, the receiving opening is radially on the outside of the receiving element as seen with respect to the axis of rotation of the insertion device. It is also conceivable for the receiving element to have receiving openings of the receiving positions on an outer circumferential region. It is also conceivable for the receiving opening to be configured on the receiving element in such a way that a longitudinal wire can be arranged at the receiving position in a radial direction with respect to the axis of rotation of the insertion device.

It has likewise proven to be advantageous for the receiving element to have a feed hopper. For example, the feed hopper is present on the receiving element so as to project in an axial direction. In particular, a feed hopper is configured in the region of a receiving position. The feed hopper is for example of hopper-like configuration, in particular, half-shell-like hopper form. Advantageously, the feed hopper is configured, and arranged on the receiving element, in such a way that a longitudinal wire can be fed in the direction of the receiving opening of the receiving position in a guided manner. Advantageously, a single receiving element of the insertion device comprises a feed hopper. For example, an in particular single receiving element of the insertion device comprises a plurality of feed hoppers. For example, a receiving element of the insertion device comprises a respective feed hopper at each receiving position.

Advantageously, the receiving element is of multi-part configuration. For example, the receiving element comprises a plurality of receiving members, for example, two or three receiving members. A receiving member is configured, for example, as a circular ring-shaped disk, as a circular disk, a ring-shaped disk and/or as a ring. Advantageously, the receiving members are rotatable relative to one another about the axis of rotation of the receiving element and/or about the axis of rotation of the insertion device. Preferably, the magnetic element is arranged on a first receiving member and the clamping elements are arranged on a second receiving member. It is also conceivable for a third receiving member to be present, wherein a magnetic element is arranged on the third receiving member. For example, the feed hopper is present on the first receiving member.

It has likewise proven to be advantageous for the second receiving member to be present between the first and the third receiving member, as seen in the axial direction. For example, the clamping elements are fastened to the second receiving member in a positionally fixed manner, in particular, in a non-movable manner. For example, the clamping elements are mounted on the second receiving member so as to be pivotable about the pivot axes of the clamping elements. For example, the magnetic elements are fastened to the first and/or third receiving member in a positionally fixed manner, in particular, in a non-movable manner. Advantageously, a closing movement and/or an opening movement of the clamping elements from the open position into the closed position and/or vice versa are/is effected by a movement of the second receiving member relative to the first receiving member and/or the third receiving member, in particular, by a movement of the two receiving members in opposite directions relative to one another. For example, a closing movement and/or an opening movement of the clamping elements from the open position into the closed position and/or vice versa are/is effected by a rotational movement of the second receiving member about the axis of rotation of the receiving member, in particular, about the axis of rotation of the insertion device. For example, the first and the third receiving member are connected to one another in a rotationally fixed manner.

The second receiving member, which comprises the clamping elements, is advantageously different from the first and/or the third receiving member. Advantageously, the second receiving member comprises a star-like element on which the clamping elements are configured. The star-like element is for example in the form of a circular disk, in particular, in the form of a circular ring-shaped disk, on which the clamping elements are arranged so as to project in the radial direction. For example, the star-like element is configured in one part with the clamping elements. Advantageously, the second receiving member comprises a stop element in addition to the star-like element. The stop element is, for example, in the form of an in particular single circular disk, in particular in the form of an in particular single circular ring-shaped disk. Advantageously, the stop element comprises two circular disks and/or two circular ring-shaped disks. Advantageously, the star-like element is present on the receiving element in the axial direction between the two circular disks and/or between the two circular ring-shaped disks. Advantageously, the receiving element and the clamping elements are configured in the manner of a disk, in particular, in the manner of a ring-shaped disk. For example, the second receiving member is of wheel-like configuration. For example, the second receiving member is mounted on the first and third receiving members so as to be rotatable between the first and the third receiving member.

Advantageously, in the closed position, the star-like element bears on a first boundary surface of the stop element by way of a first buffer element. Preferably, in the open position, the star-like element bears on a second boundary surface of the stop element by way of a second buffer element. In this way, longitudinal wires with differing diameters can be clamped on the first receiving member by way of the second receiving member.

In an advantageous modification of the present invention, the transport apparatus is configured as an endless-loop elevator mechanism, as a belt conveyor unit, as an elevator and/or as a continuous-loop elevator mechanism. This makes it possible to separate the longitudinal wires before the longitudinal wires are fed to the insertion device. This accelerates a loading rate for loading of the insertion device with longitudinal wires by the feed apparatus.

Advantageously, the feed apparatus is configured in such a way that all the longitudinal wires required for production of a cage can be deposited in isolated form on the feed apparatus prior to the loading operation. This accelerates a loading rate for loading of the insertion device with longitudinal wires by the feed apparatus.

A further advantageous embodiment of the invention is a cage welding machine which has retaining elements on wire guide tubes of the cage welding machine for the purpose of clamping the longitudinal wires. For example, the cage welding machine comprises retaining elements for the releasable fixing of the longitudinal wires. In this way, it is possible to implement comparatively rapid feeding of longitudinal wires by an insertion device, in particular, by an insertion device according to one of the aforementioned embodiments. Preferably, the retaining elements are configured as pneumatic clamping mechanisms, for example, as pneumatic clamps. The wire feed tubes are also referred to as wire leadthrough tubes, for example.

A further advantageous embodiment of the present invention is a cage welding machine, in particular, having an apparatus according to one of the aforementioned embodiments, wherein the cage welding machine is configured in such a way that the axis of rotation D of the insertion device, in particular, the shaft of the insertion device, can be mounted on the cage welding machine. For example, the cage welding machine comprises an axial mounting member, such that the axis of rotation of the insertion device can be mounted on the cage welding machine on the axial mounting member.

Advantageously, the axis of rotation of the insertion device can be arranged on the axial mounting member of the cage welding machine, such that the axial mounting member supports the axis of rotation.

Advantageously, the axis of rotation of the insertion device and an axis of rotation of the cage welding machine coincide. For example, the axis of rotation of the insertion device and an axis of rotation of the cage welding machine lie one on top of the other. For example, the shaft of the insertion device is mounted on a rotary bearing of the main wheel of the cage welding machine. Advantageously, the shaft of the insertion device is connected to the main wheel of the cage welding machine.

In an advantageous embodiment of the present invention, the insertion device according to one of the aforementioned embodiments is a constituent part of the cage welding machine, wherein the insertion device comprises a drive shaft and a drive apparatus for driving the actuating elements of the cage welding machine. Preferably, the drive shaft is present within the shaft of the insertion device and/or within the rail-like guide member of the insertion device. The shaft and/or the rail-like guide member of the insertion device are/is advantageously in the form of a square tube.

The shaft is configured for example as a drawn square tube. The shaft advantageously comprises the rail-like guide member.

It has also proven to be advantageous for a guide apparatus for guiding a wire guide tube of the cage welding machine to be present on the cage welding machine.

The wire guide tube serves for the comparatively simple and production-reliable loading of the cage welding machine with a longitudinal wire and at the same time for the guiding and support of the longitudinal wire during the production of the cage by means of the cage welding machine. For example, a retaining element is configured on a wire guide tube.

The guide apparatus advantageously comprises guide slots which extend in the radial direction with respect to the axis of rotation of the cage welding machine, wherein a wire guide tube is mounted in each guide slot so as to be movable in the radial direction. In this way, a circumferential spacing of the wire guide tubes from one another, about the axis of rotation of the cage welding machine, is ensured. For example, the guide apparatus is of disk-like and/or wheel-like configuration. For example, the guide apparatus is configured in the form of a circular disk and/or in the form of a wheel. It is conceivable for the guide slots to be configured in a spoke-like manner, for example, as spokes. Preferably, the guide apparatus is present on the cage welding machine in the axial direction of the axis of rotation of the cage welding machine so as to be spaced apart from the expansion wheel of the cage welding machine.

An advantageous embodiment of the present invention is a method for loading a cage welding machine with longitudinal wires by means of an insertion device, wherein the method has the following method steps which are carried out in succession:

- moving a receiving element of the insertion device in the axial direction of the axis of rotation of the insertion device in the direction of the expansion wheel of the cage welding machine,
- fixing the longitudinal wires by means of a further receiving element and/or by means of the cage welding machine,
- moving the receiving element of the insertion device in the axial direction of the axis of rotation of the insertion device away from the expansion wheel of the cage welding machine,
- fixing the longitudinal wires by means of the receiving element,
- releasing the fixing of the longitudinal wires by means of the further receiving element and/or releasing the fixing of the longitudinal wires by means of the cage welding machine,
- moving the receiving element of the insertion device in the axial direction of the axis of rotation of the insertion device in the direction of the expansion wheel of the cage welding machine.

Advantageously, the insertion device is loaded with a number of longitudinal wires required for production of a cage by means of the cage welding machine prior to the aforementioned loading method.

BRIEF DESCRIPTION OF THE DRAWINGS

An exemplary embodiment will be explained in more detail with reference to the schematic drawings below with further details and advantages being specified.

FIG. 2 shows a schematic illustration of a cage welding machine having an arranged apparatus in a lateral view transverse to the axis of rotation of the apparatus;

FIG. 3 shows a top lateral oblique partial view of the apparatus;

FIG. 4 shows a front lateral oblique cross-sectional view of a partial detail of the apparatus;

FIG. 8 shows a partial view of a receiving element of the apparatus;

FIG. 9 shows an enlarged detail A of the receiving element as per FIG. 8;

FIGS. 10 to 12 each show a view of a detail of a receiving element from a point of view in the axial direction, wherein in each case elements of the receiving element have been omitted for the purpose of easier comprehension; and FIG. 13 shows a schematic illustration of a cage welding machine having an arranged apparatus in different positions.

DETAILED DESCRIPTION OF THE INVENTION

Figure 1:
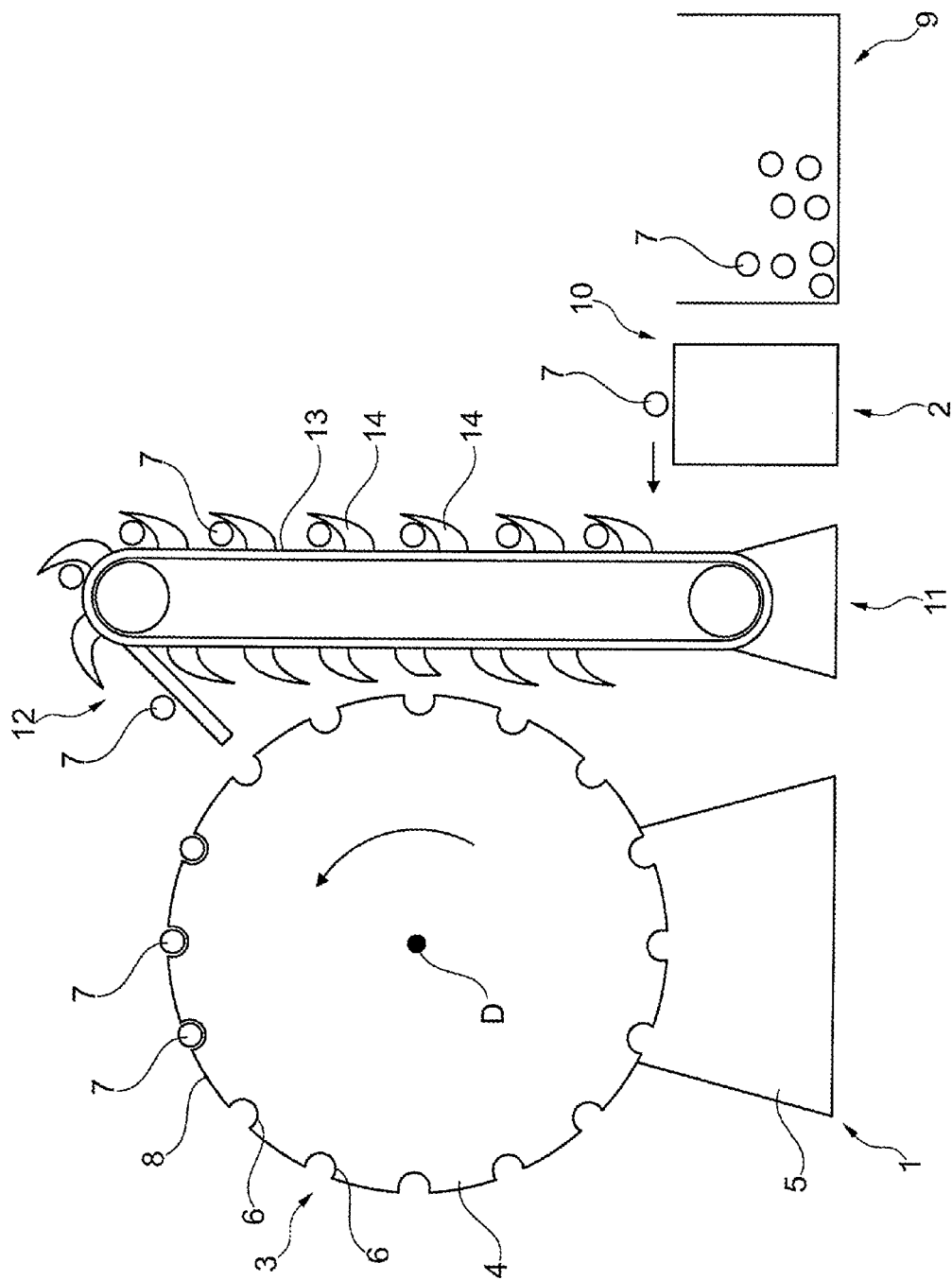
FIG. 1 shows a schematic illustration of an apparatus according to the present invention in a lateral view in the direction of an axis of rotation of the apparatus.

FIG. 1 shows an apparatus according to the present invention comprising an insertion device 1 and, for example, a feed apparatus 2.

The insertion device 1 comprises, for example, a loading roller 3, which for example comprises a receiving element, for example, in the form of a collecting wheel 4. Advantageously, the receiving elements, for example, the collecting wheels 4, form the loading roller 3. The collecting wheel 4 is advantageously mounted, for example, on a support foot 5 so as to be rotatable about an axis of rotation D of the insertion device 1. For example, the support foot 5 comprises rolls on which the collecting wheel 4 is rotatably mounted. Receiving positions 6 for receiving longitudinal wires 7 are formed on the collecting wheel 4. The receiving positions 6 are formed on a circumferential outer side 8, for example, a shell surface, of the collecting wheel 4, such that the insertion device 1 is configured to be able to be loaded with longitudinal wires 7 from the side.

The feed apparatus 2 comprises, for example, a supply frame 9, a separating device 10, a transport apparatus 11 and/or a transfer apparatus 12. The supply frame 9 is configured for example as a trough, in which longitudinal wires 7 can be stored collectively as supply. The separating device 10 is configured to remove the longitudinal wires 7 from the supply frame 9 and to separate them, in particular, to feed them successively to the transport apparatus 11. The transport apparatus 11 is configured, for example, as a belt conveyor unit with a belt 13 and a plurality of driver elements 14. For example, on the transport apparatus 11, a number of longitudinal wires 7 required for production of a cage can be mounted separately from one another, for example, in isolated form, on the driver elements 14. The transfer apparatus 12 is advantageously configured as a chute, along which the longitudinal wires 7 dispensed from the transport apparatus 11 to the transfer apparatus 12 can slide in the direction of a receiving position 6 of the collecting wheel 4.

FIG. 2 shows the insertion device 1 in the state arranged on a cage welding machine 15. The cage welding machine 15 for production of a reinforcement cage has, for example, a main wheel 16, an advancing carriage in the form of a transport carriage 17 and an expansion drive 18. The main wheel 16 is fastened, for example, to a main frame 19, in particular, in a positionally fixed manner with respect to the main frame 19. Furthermore, the cage welding machine 15 comprises, for example, an expansion shaft 20, which is coupled to an expansion block 21, wherein the expansion drive 18 is arranged, for example, on the expansion block 21. The transport carriage 17 comprises an advancing wheel 22 and is mounted on guide rails 23 in a linearly movable manner. The main wheel 16 is in the form of an expansion wheel, for example. For example, a welding and/or binding unit 24 for connecting a longitudinal wire 7 to a cross wire (not shown) is arranged on the main frame 19. Wire guide tubes 25 are advantageously arranged on the main wheel 16. For example, a drive apparatus for driving the main wheel 16 is configured on the main frame 19. For example, the drive on the main frame 19 drives a rotational movement of the main wheel 16 about an axis of rotation of the main wheel 16.

Advantageously, at least one collecting wheel 4 of the insertion device 1 is mounted and/or supported in a displaceable manner via a support foot 5 on a guide element, which is configured, for example, as a guide rail 26.

FIG. 3 shows a detail of a shaft 27 of the insertion device 1 in an enlarged view. For example, three collecting wheels 4 are mounted on the shaft 27 so as to be movable along an axial direction of the axis of rotation D of the insertion device 1. The shaft 27 is coupled, at a second end 28, to a drive 29 of the insertion device 1. For example, the shaft 27 is mounted, at a first end 30, in particular, movably on the cage welding machine 15, in particular, on the main wheel 16.

A guide member, for example, in the form of a guide rail 31 which extends along the axis of rotation D of the insertion device 1, is advantageously fastened to the shaft 27. Also arranged for example on the shaft 27 is a toothed-belt gear mechanism 32 which extends along the axis of rotation D of the insertion device 1. It is also conceivable for a collecting wheel 4 to be driven by means of a toothed rack and a geared motor. Advantageously, the collecting wheels 4 are guided by the guide rail 31. For example, the collecting wheels 4 are driven. Advantageously, the collecting wheels 4 are configured to be drivable independently of one another by the toothed-belt gear mechanism 32 and/or by means of a toothed-rack gear mechanism.

FIG. 4 shows the shaft 27 in cross section, transversely with respect to the axis of rotation D of the insertion device 1. The shaft 27 is advantageously configured as a square tube. Preferably, the expansion shaft 20 and, for example, a drive rod 33 and/or a drive shaft for driving the main wheel 16 of the cage welding machine 15 are arranged in an interior of the shaft 27 configured as a square tube. For example, on the shaft 27 there is a positioning unit 34, for example in the form of a graticule, grid plate and/or glass scale, for determining a position of the collecting wheels 4 relative to a zero point and/or in the form of a toothed rack.

Figure 5:
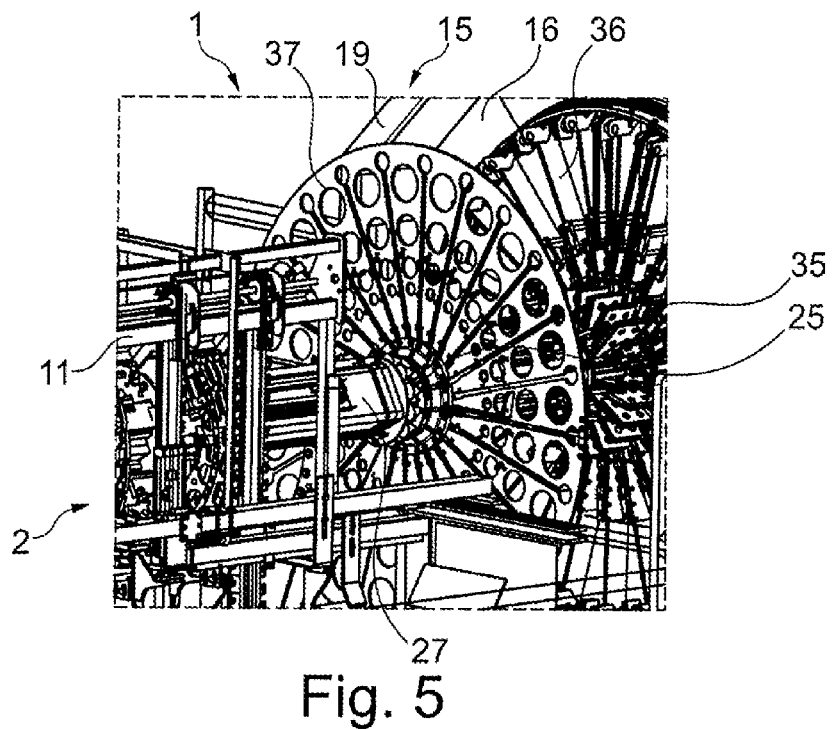
FIG. 5 shows a rear lateral oblique partial view of a cage welding machine having an arranged apparatus.

FIG. 5 shows a partial detail of an apparatus which is arranged on the cage welding machine 15 and which comprises the insertion device 1 and the feed apparatus 2. FIG. 5 shows the main wheel 16 of the cage welding machine 15, the main wheel being, in particular, rotatably mounted on the main frame 19. Wire guide tubes 25 are fastened to the main wheel 16 in the radial direction with respect to the axis of rotation D of the insertion device and/or in the radial direction with respect to the axis of rotation of the cage welding machine. The wire guide tubes 25 are movable, together with actuating elements 35 of the main wheel 16, in the radial direction along spokes 36 of the main wheel 16 via expansion slides of the cage welding machine 15 that are drivable by means of the expansion drive 20.

Figure 7:
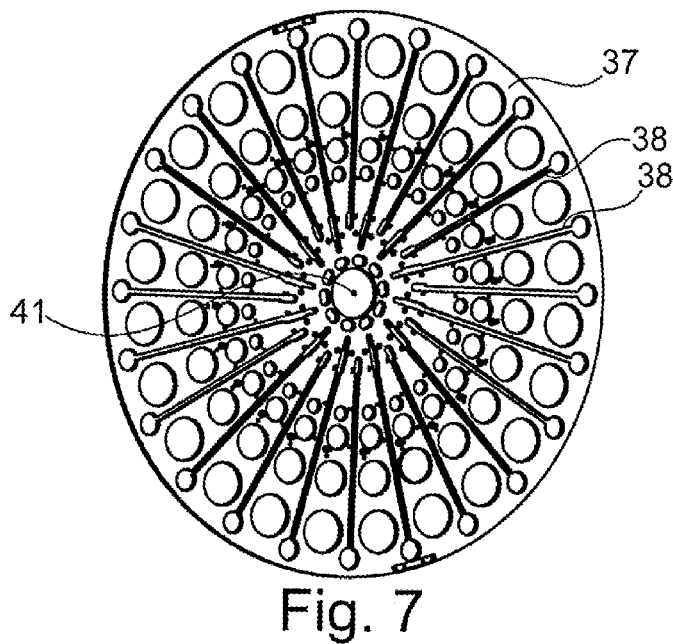
FIG. 7 shows a front lateral oblique view of a guide apparatus.

It is also advantageous for a guide apparatus in the form of a guide wheel 37 to additionally be present, wherein the wire guide tubes 25 are mounted so as to be linearly movable along guide slots 38 in a guided manner. Preferably, the guide wheel 37 is present so as to be rotatable on the cage welding machine 15. For example, the guide wheel 37 is drivable by means of a drive shaft, in particular, jointly with the main wheel 16. The guide wheel 37 can be arranged on the cage welding machine 15 so as to be rotatable, for example, about an axis of rotation 41 of the guide wheel 37 (FIG. 7).

Figure 6:
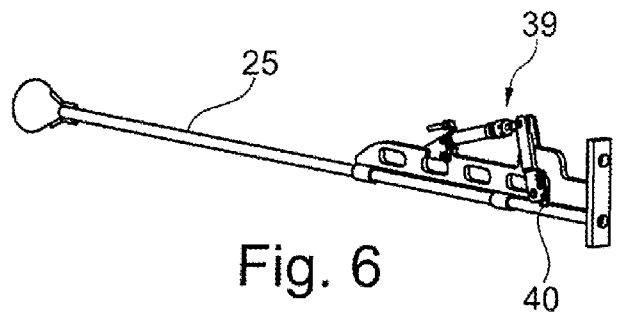
FIG. 6 shows a front lateral oblique view of a wire guide tube.

An, in particular, pneumatically drivable retaining element 39 is advantageously present on a wire guide tube 25. A longitudinal wire 7 arranged on the wire guide tube 25 can be fixed, advantageously in a releasable manner, by means of the retaining element 39. For example, the retaining element 39 comprises a ram 40 which, in a retaining state of the retaining element 39, clamps the longitudinal wire 7 against an inner wall of the wire guide tube 25 (FIG. 6).

FIG. 8 shows a collecting wheel 4, wherein parts of the collecting wheel 4 have been omitted for the purpose of better comprehension. The collecting wheel 4 comprises, for example, three receiving members 42, 43, 44. For example, feed hoppers 46 are configured on an outer side 45 of a first receiving member 42 so as to project in the axial direction. Moreover, the collecting wheel 4 comprises, for example, a drive unit 60 comprising a buffer store in the form of a pressure tank 47 and a pneumatic drive in the form of a pneumatic cylinder 59.

Slot-like receiving positions 6 which have a receiving opening 48 are advantageously present on the first and for example on a third receiving member 42, 44. The receiving openings 48 are advantageously present on a shell surface 49 of the first and of the third receiving member 42, 44. The second receiving member 43 is, for example, configured differently to the first and to the third receiving member 42, 44. The second receiving member 43 comprises, for example, a clamping element 50 with a clamping surface 51.

FIGS. 10 to 12 show a further detail of the collecting wheel 4, wherein in each case parts of the third receiving member 44 have been omitted in FIGS. 11 and 12. On the first and third receiving members 42, 44, magnetic elements in the form of permanent magnets 52 are configured in the region of the receiving positions 6. The receiving positions 6 also advantageously comprise bearing surfaces 53, in which the longitudinal wires 7 can be mounted and against which a longitudinal wire 7 is pressed, and thus fixed, by the clamping surface 51 in a closed position of the clamping element 50. Buffer elements 54, by means of which it is possible to compensate for a dimensional difference between the longitudinal wires 7 arranged on the collecting wheel 4, in particular in terms of diameter, are advantageously arranged on the clamping element 50. A longitudinal wire 7 is advantageously clamped by a relative movement, in particular, by a rotation of the second receiving member 43 relative to the first and the second receiving member 42, 44. The relative movement is brought about, for example, by a stroke movement of the pneumatic cylinder 59.

FIG. 13 shows a possible method sequence for loading a cage welding machine 15 by means of an insertion device 1.

For example, further, in particular other, method sequences for loading the cage welding machine 15 are not ruled out. The insertion device 1 as per FIG. 13 comprises two collecting wheels 56, 57.

The method sequence shown in FIG. 13 will be explained below.

Firstly, in a first method step (image I, FIG. 13), the insertion device 1 is loaded with longitudinal wires 7. Here, the feed apparatus (not shown) is advantageously positionally fixed and always loads at the same location. It is rather the case that the collecting wheels of the insertion device 1 rotate the receiving positions 6 one position further about the axis of rotation D of the insertion device 1 as soon as a receiving position 6 has been loaded with a longitudinal wire 7 (image II, FIG. 13). During the loading of the insertion device 1, a cage 55 is advantageously produced by the cage welding machine 15.

In a further method step (image III, FIG. 13), the production of the cage 55 by the cage welding machine is terminated and, in particular, at the same time as termination of the production, the collecting wheels along with the longitudinal wires 7 are moved toward the main wheel 16 along the axis of rotation D of the insertion device 1.

During the loading of the cage welding machine 15 with longitudinal wires 7, the cage 55 which has already been produced is advantageously removed (images III-V, FIG. 13).

If the collecting wheels have been moved toward the main wheel 16 of the cage welding machine 15 to such an extent that the longitudinal wires 7 have been at least partially introduced into the wire guide tubes 25, for example, a second collecting wheel 56 clamps the longitudinal wires 7, such that a first collecting wheel 57 can run back along the axis of rotation D (image V, FIG. 13). It is also conceivable that the first collecting wheel 57 remains stationary, releases any fixing of the longitudinal wires 7, and the second collecting wheel 56 transports the longitudinal wires 7 further in the direction of the cage welding machine 15.

If the first collecting wheel 57 has been run back, the two collecting wheels 56, 57 advantageously fix the longitudinal wires 7 and, in a next step, transport the longitudinal wires 7 along the axis of rotation D further in the direction of the cage welding machine 15 (image VI, FIG. 13).

As soon as the first collecting wheel 57 has been maximally moved toward the cage welding machine 15, any fixing of the longitudinal wires 7 to the first collecting wheel 57 is released and the second collecting wheel 56 transports the longitudinal wires 7 further in the direction of the cage welding machine 15 until the second collecting wheel 56 has also reached a position in which it is maximally movable toward the cage welding machine 15 (image VII, FIG. 13). The second collecting wheel 56 subsequently releases a fixing of the longitudinal wires 7.

In a further method step, the second collecting wheel 56 is run back into a loading position for renewed loading with longitudinal wires 7. In particular at the same time, the transport carriage 17 is brought up to the longitudinal wires 7 introduced onto the cage welding machine 15 (image VIII, FIG. 13).

Here, the transport carriage 17 pushes the longitudinal wires 7 along the axis of rotation D back in the direction of the first collecting wheel 57 until ends 58 of the longitudinal wires 7 have been introduced equidistantly in the direction of the transport carriage 17 into the cage welding machine 15 (image IX, FIG. 13). The first collecting wheel 57 subsequently fixes the longitudinal wires 7, such that the transport carriage 17 can grip the longitudinal wires at the ends 58 without changing a position of the longitudinal wires along the axis of rotation D. If the transport carriage 17 has fixed the longitudinal wires 7 at their ends 58, the first collecting wheel 57 releases the fixing to the longitudinal wires 7 and is run back to a loading position for renewed loading with longitudinal wires 7 (image X, FIG. 13).

LIST OF REFERENCE DESIGNATIONS

1 Insertion device
2 Feed apparatus
3 Loading roller
4 Collecting wheel
5 Support foot
6 Receiving position
7 Longitudinal wire
8 Outer side
9 Supply frame
10 Separating device
11 Transport apparatus
12 Transfer apparatus
13 Belt
14 Driver element
15 Cage welding machine
16 Main wheel
17 Transport carriage
18 Expansion drive
19 Main frame
20 Expansion shaft
21 Expansion block
22 Advancing wheel
23 Guide rails
24 Welding and/or binding unit
25 Wire guide tube
26 Guide rail
27 Shaft
28 End
29 Drive
30 End
31 Guide rail
32 Toothed-belt gear mechanism
33 Drive rod
34 Positioning unit
35 Actuating element
36 Spoke
37 Guide wheel
38 Guide slot
39 Retaining element
40 Ram
41 Axis of rotation
42 Receiving member
43 Receiving member
44 Receiving member
45 Outer side
46 Feed hopper
47 Pressure tank
48 Receiving opening
49 Shell surface
50 Clamping element
51 Clamping surface
52 Permanent magnet
53 Bearing surface
54 Buffer element
55 Cage
56 Collecting wheel
57 Collecting wheel
58 End 59 Pneumatic cylinder
60 Drive unit

The invention claimed is:

1. A cage welding machine comprising retaining elements present on wire guide tubes of the cage welding machine for the purpose of clamping the longitudinal wires, wherein the cage welding machine comprises a main wheel and an advancing wheel, wherein the wire guide tubes are fastened to the main wheel, wherein the advancing wheel is configured to transport the longitudinal wires along an axis of rotation of the cage welding machine away from the main wheel during production of the cage, and wherein the retaining elements are configured as pneumatic clamping mechanisms.

2. The cage welding machine of claim 1, wherein the clamping of the longitudinal wires by the pneumatic clamping mechanisms of the retaining elements is continuously released during a manufacture of a reinforcement.

3. A cage welding machine comprising retaining elements present on wire guide tubes of the cage welding machine for the purpose of clamping the longitudinal wires, wherein the cage welding machine further comprises an apparatus for loading the cage welding machine comprising an insertion device, having a receiving element for receiving longitudinal wires of a cage to be produced using the cage welding machine, wherein the insertion device has, on the receiving element, a multiplicity of receiving positions for all the longitudinal wires of the cage, wherein the receiving positions are present in a radial direction so as to be spaced apart from an axis of rotation D of the insertion device, wherein the insertion device is configured to simultaneously feed at least two longitudinal wires arranged on the insertion device to the cage welding machine in an insertion operation, and wherein the operation of inserting the longitudinal wires onto the cage welding machine is effected by a movement of the insertion device in an axial direction of the axis of rotation D of the insertion device, and wherein the retaining elements are configured as pneumatic clamping mechanisms.

4. A cage welding machine comprising retaining elements present on wire guide tubes of the cage welding machine for the purpose of clamping the longitudinal wires, wherein the cage welding machine further comprises an apparatus for loading the cage welding machine comprising an insertion device, having a receiving element for receiving longitudinal wires of a cage to be produced using the cage welding machine, wherein the insertion device has, on the receiving element, a multiplicity of receiving positions for all the longitudinal wires of the cage, wherein the receiving positions are present in a radial direction so as to be spaced apart from an axis of rotation D of the insertion device, wherein the insertion device is configured to simultaneously feed at least two longitudinal wires arranged on the insertion device to the cage welding machine in an insertion operation, and wherein the operation of inserting the longitudinal wires onto the cage welding machine is effected by a movement of the insertion device in an axial direction of the axis of rotation D of the insertion device, wherein the axis of rotation D of the insertion device is mounted on the cage welding machine, and wherein the retaining elements are configured as pneumatic clamping mechanisms.

\* \* \* \* \*